United States Patent
Nakao et al.

(10) Patent No.: US 6,320,832 B1
(45) Date of Patent: Nov. 20, 2001

(54) LASER POWER CONTROL IN INFORMATION RECORDING DEVICE

(75) Inventors: Yoshihiro Nakao; Haruhiko Izumi, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/360,970

(22) Filed: Jul. 27, 1999

(30) Foreign Application Priority Data

Jan. 20, 1999 (JP) .................................................. 11-011432

(51) Int. Cl.[7] ...................................................... G11B 5/09
(52) U.S. Cl. ..................................... 369/47.53; 369/53.26; 369/59.11; 369/116
(58) Field of Search ............................ 369/47.27, 47.5, 369/47.53, 53.26, 53.27, 59.11, 59.15, 59.16, 59.24, 116, 13

(56) References Cited

U.S. PATENT DOCUMENTS

| | | | |
|---|---|---|---|
| 5,475,666 | * | 12/1995 | Ito et al. ............................ 369/47.52 |
| 5,737,289 | * | 4/1998 | Udagawa ............................ 369/116 |
| 5,737,301 | * | 4/1998 | Miyamoto et al. .................. 369/116 |
| 5,815,477 | * | 9/1998 | Kimura et al. ..................... 369/47.53 |
| 5,949,747 | * | 9/1999 | Miyashita et al. ................. 369/53.26 |
| 6,246,641 | * | 6/2001 | Miyaoka ................................ 369/13 |

FOREIGN PATENT DOCUMENTS

| | | |
|---|---|---|
| 3156750 | 7/1991 | (JP) . |
| 8212610 | 8/1996 | (JP) . |
| 10064064 | 3/1998 | (JP) . |

* cited by examiner

*Primary Examiner*—Thang V. Tran
(74) *Attorney, Agent, or Firm*—Greer, Burns & Crain, Ltd.

(57) ABSTRACT

A method and device for controlling a power of pulsed light is provided, which is emitted by a light source, condensed by a object lens and irradiated to a recording medium for recording information in the recording medium. In order to use the power more efficiently under the limitation of the maximum output of the light source and the maximum efficiency of condensing light in the optical system, the method includes steps of performing test writing with the pulsed light having a fixed bottom power and variable peak power, calculating an optimum average power in accordance with the bottom power and the peak power of the optimum condition obtained by the test writing step, and recalculating the peak power and the bottom power in accordance with the optimum average power so that the peak power is decreased and the bottom power is increased.

13 Claims, 6 Drawing Sheets

LASER POWER CONTROL IN INFORMATION RECORDING DEVICE

BACKGROUND OF THE INVENTION

1. Field of the Invention

The present invention relates to a method and a device for controlling power of pulsed light emitted by a light source, condensed by a object lens and irradiated to a recording medium for recording information in the recording medium. More specifically, the present invention relates to determination of a peak power and a bottom power in the information record using pulsed light.

2. Description of the Prior Art

Recently, request for high record density and high speed of data transmission has become stronger and stronger in the information recording device using an optical disk or a magneto-optical disk.

In order to record information in a recording medium such as a magneto-optical disk, it is necessary to condense a laser beam from a light source such as a laser diode using an object lens and irradiate the laser beam to the recording medium. In the case of a magneto-optical disk, a recording magnetic film at a portion irradiated with the laser beam is heated to a temperature above the Curie point, so that the recording magnetic film is magnetized in the vertical direction by the magnetic field applied externally. A bit information "0" or "1" is recorded in accordance with the direction of the magnetizing. In the case of a phase-change type optical disk, a recording film at a portion irradiated with the laser beam is changed from crystalline state to amorphous state by being heated and cooled, so that a pit corresponding to a bit information "0" or "1" is formed.

There are two methods for recording information in the magneto-optical disk. One is light modulation method, and another is magnetic field modulation method. In the light modulation method, the magnetized direction of the recording magnetic film in the recording area is aligned in one direction by erasing process, and then only the portion of the recording magnetic film irradiated with laser beam is magnetized in the opposite direction. Namely, the portion irradiated with laser beam and other portions have different magnetized direction to each other.

The magnetic field modulation method uses a continuous light or a pulsed light to irradiate the recording magnetic film, while alternating the direction of the magnetic field that is applied to the recording magnetic film in accordance with the record information ("0" or "1"). Thus, the magnetized direction of the recording magnetic film is alternated in accordance with the recorded information. The magnetic field modulation method can be adapted to overwriting, so that the erasing step for aligning the magnetized direction of the recording magnetic film in the recording area is not necessary.

In each method for recording information mentioned above, the power of the irradiated light must be controlled and optimized when the laser beam is condensed and irradiated to the recording medium. If the irradiation power, i.e., the light emission power is too low or too high, an adequate C/N ratio (the ratio of carrier and noise) and a predetermined error rate cannot be obtained.

One method that has been used for satisfy the above-mentioned condition is to perform test writing with a predetermined light emission power before writing data, so as to determine the optimum power in accordance with the error rate obtained by the read signal after the test writing as disclosed in Japanese Unexamined Patent Publication No. 6-212610(A), for example. In the case of pulsed light recording, the bottom power is usually preset to a value nearly equal zero, and the peak power is increased step by step from relatively small value, so as to repeat the test writing and the reading.

Figure 5:
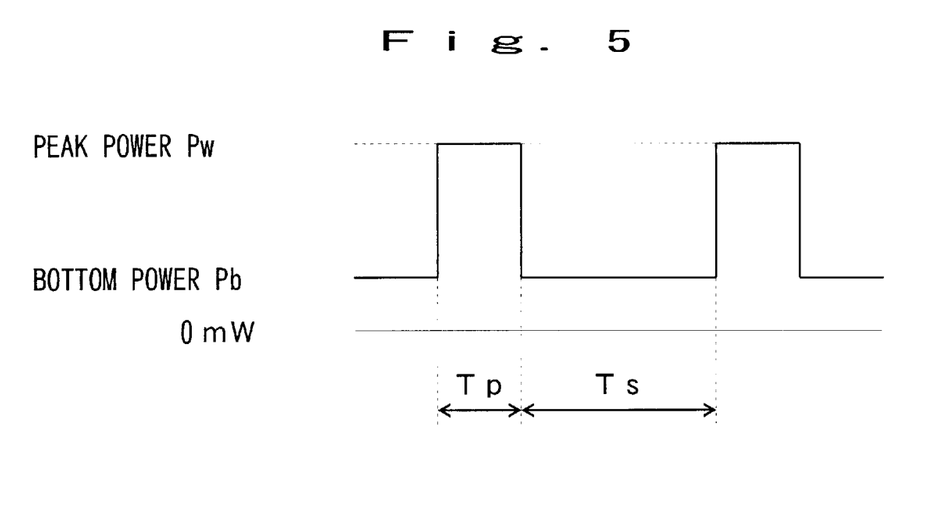
FIG. 5 is a diagram of waveforms showing the relationship among a bottom power Pb, a peak power Pw and emission periods Ts, Tp thereof.

FIG. 5 shows an example of the bottom power Pb, the peak power Pw, the emission periods Ts and Tp in the case of pulsed light emission. If the bottom power Pb is zero, the light emission duty is given by the expression Tp/(Tp+Ts). Hereinafter, the light emission duty is assumed to be given by the expression Tp/(Tp+Ts) also in the case where the bottom power Pb is not zero.

Figure 6:
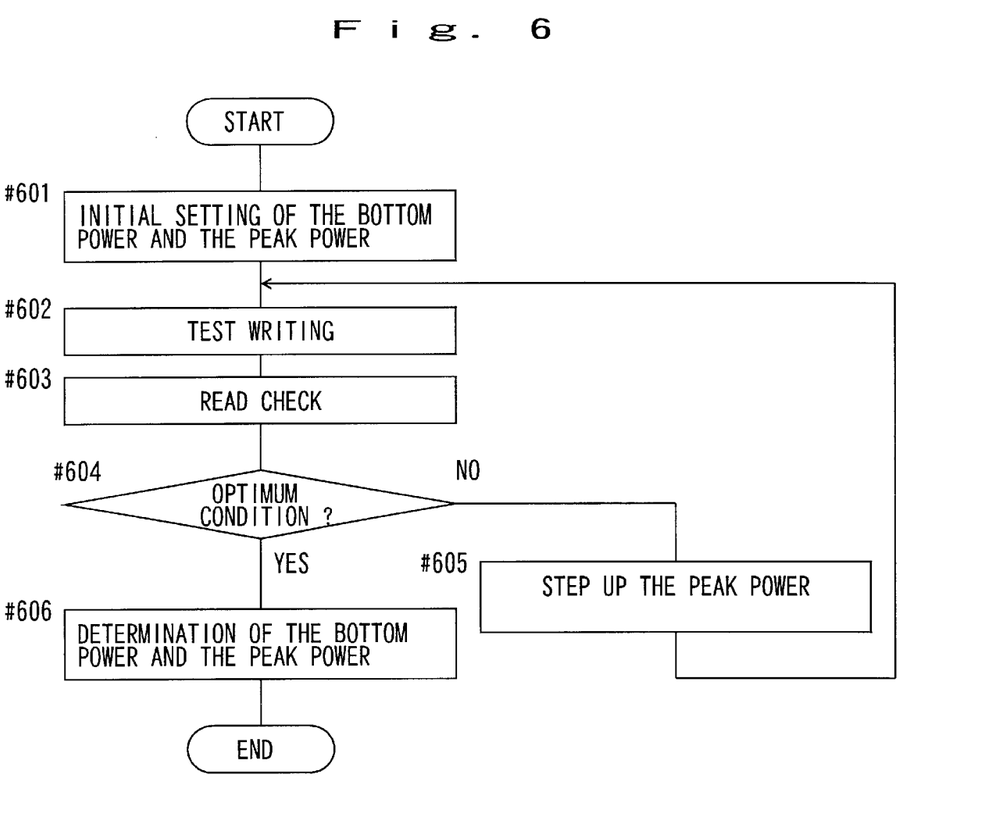
FIG. 6 is a flow chart showing the conventional method for determining the power of irradiated light.

FIG. 6 is a flow chart showing the conventional method for determining the power of the irradiated light. In this example, on the precondition that the light emission duty is fixed, the bottom power is preset (fixed) to a predetermined value in Step #601, the peak power increases step by step in Step #605, while the test writing in Step #602 and the read check in Step #603 are repeated. For example, starting from a relatively low peak power in Step #601, the peak power is increased step by step until a good result of read check (the optimum condition) after the test writing is obtained in Step #604. Thus, the optimum peak power, the bottom power and the light emission duty (i.e., the optimum light emission power) is determined in Step #606.

If the optimum condition is not obtained after increasing peak power to a possible upper limit, the emission period Ts of the peak power Pw may be increased so as to enlarge the light emission duty. Then, the test writing and the read check may be repeated.

However, when determining the optimum light emission power by the above-mentioned conventional method, the peak power can be insufficient because of the following reasons.

First, the maximum power of the laser diode that can be used for the product is limited. In addition, if the disk recording medium rotates in a constant rotation speed, peripheral speed in the outer portion of the disk recording medium is faster than that in the inner portion, and a larger peak power is required in the outer portion.

Furthermore, since a small condensed light spot is required along with recent high recording density, only center portion of the laser beam emitted by the laser diode is used after condensed by the object lens, while the peripheral portion of the laser beam is not used. In other words, there is a tendency to increase the vignetting of the object lens so as to obtain a smaller light spot, resulting in decrease of efficiency of condensing.

There is also a limit in the method of increasing the emission period of the peak power and enlarging the light emission duty so as to increase the light emission power. Namely, when the emission period of the peak power is increased, heat distribution becomes extended, so a cross write between neighboring tracks may occur, or an edge deterioration of the recorded mark may be easily generated.

As a result, reading characteristics and an error rate may be deteriorated.

Because of the above-mentioned factors, the peak power may become insufficient. Other factors such as a variation of ambient temperature also can cause the insufficient peak power. In order to get sufficient error rate at the upper limit of the peak power, the rotation speed as well as the peripheral speed of the disk recording medium must be lowered. However, the lowered speed may cause a problem that the device is not capable of the high speed data transmission.

SUMMARY OF THE INVENTION

The object of the present invention is to provide a method and a device for controlling power of the irradiated light which can use the power more efficiently under the limitation of the maximum output of the light source and the maximum efficiency of condensing light in the optical system, so as to support the high speed data transmission.

Another object is to determine the optimum power by the minimal number of test writing.

The method of the present invention, for controlling the power of pulsed light emitted by a light source, condensed by a object lens and irradiated to a recording medium for recording information in the recording medium, includes the steps of performing test writing with the pulsed light having a fixed bottom power and variable peak power, calculating an optimum average power in accordance with the bottom power and the peak power of the optimum condition obtained by the test writing step, and recalculating the peak power and the bottom power in accordance with the optimum average power so that the peak power is decreased and the bottom power is increased.

In an embodiment of the present invention, the recalculating step is performed so that a recording average power is substantially equal to the optimum average power. This is efficient especially for a disk recording medium whose peripheral speed is controlled to be constant not depending on a position in the radial direction.

In the case of a disk recording medium whose peripheral speed varies in accordance with a position in the radial direction (i.e., the rotation speed is constant), the recalculating step is preferably performed so that a recording average power is substantially equal to a value obtained by multiplying the optimum average power with a coefficient determined in accordance with the position in the radial direction.

Figure 3:
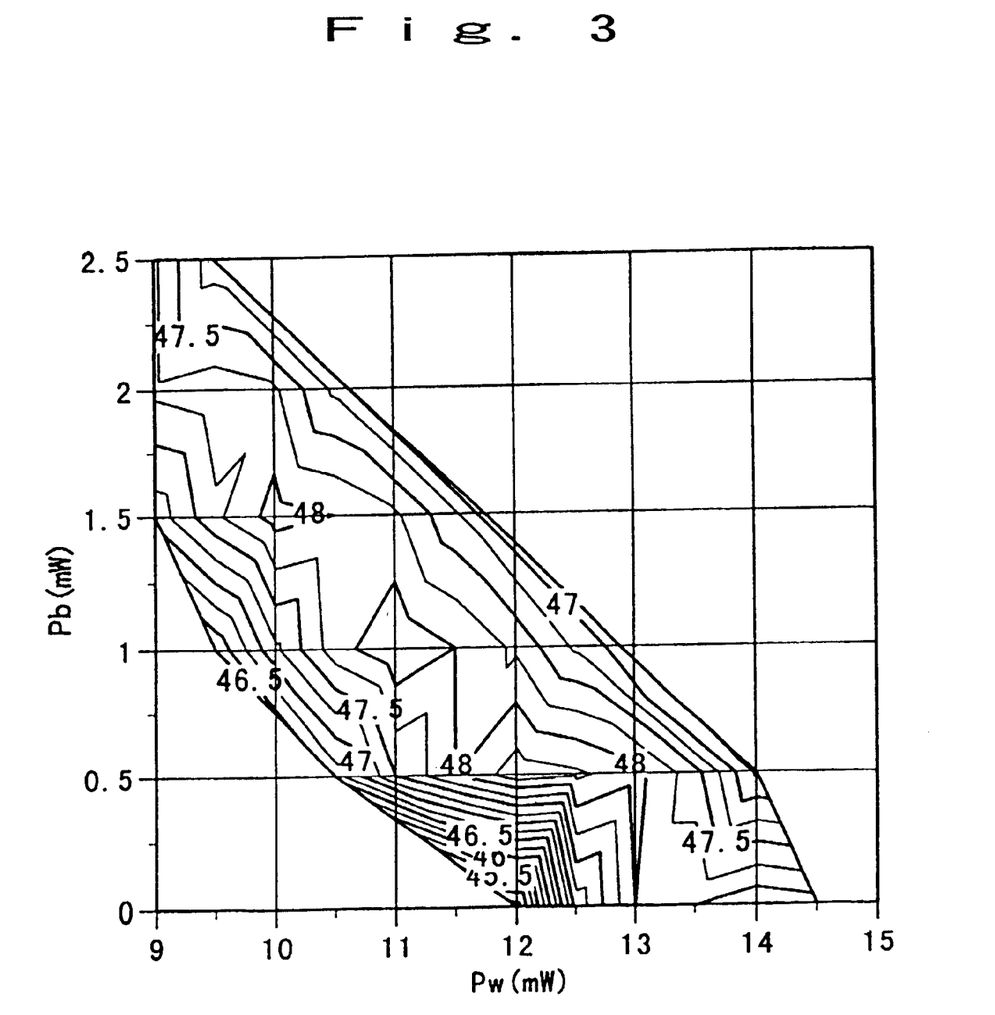
FIG. 3 is a graph showing the relationship among the peak power, the bottom power and the C/N ratio in accordance with a measured data, which is a basis of the present invention.

According to the above-mentioned method, an optimum power with a lower peak power can be determined by the recalculation easily after less number of test writing. This is based on a discovery of the relationship among the peak power, the bottom power and the C/N ratio in recording with the pulsed light as shown in FIG. 3, which will be explained in detail.

It is preferable to perform the test writing at the position in the radial direction where the peripheral speed is the slowest in the case of the disk recording medium whose peripheral speed varies in accordance with a position in the radial direction. This is because the optimum condition can be obtained securely when the peripheral speed is low, since the irradiation power can be low.

If the peripheral speed varies in accordance with a position in the radial direction, the recording area of the disk recording medium is preferably divided into plural zones in the radial direction, and a unique value of the coefficient is assigned to each of the zones for multiplying the optimum average power with the coefficient value. The less number of the zones, the rougher the precision of the optimum condition becomes, while the smaller the size of the table that is used for setting the value of the coefficient becomes.

It is also preferable to set the fixed bottom power smaller than read power in the test writing step and to increase the bottom power to the value substantially equal to the read power in the recalculating step. The read power is usually set to a value within a range that cannot affect information pits and that can derive sufficient reflected light.

The device of the present invention for controlling the power of pulsed light irradiated to a recording medium includes a means for performing each step (i.e., test writing, calculation of the optimum average power, and recalculation of the peak power and the bottom power), which are constituted with a microprocessor (MPU) and a program thereof.

Furthermore, the information recording device of the present invention includes a recording medium, a light source for emitting pulsed light, an optical system for condensing the light from the light source to irradiate the recording medium and for condensing light reflected by the recording medium, a photo detector for receiving the condensed light to generate a read signal, and a controller for controlling a drive circuit of the light source in accordance with an output signal of the photo detector. The controller performs the above-mentioned control of power of pulsed light.

DESCRIPTION OF THE PREFERRED EMBODIMENTS

The present invention will be described in detail hereinafter with reference to the accompanying drawings.

Figure 4:
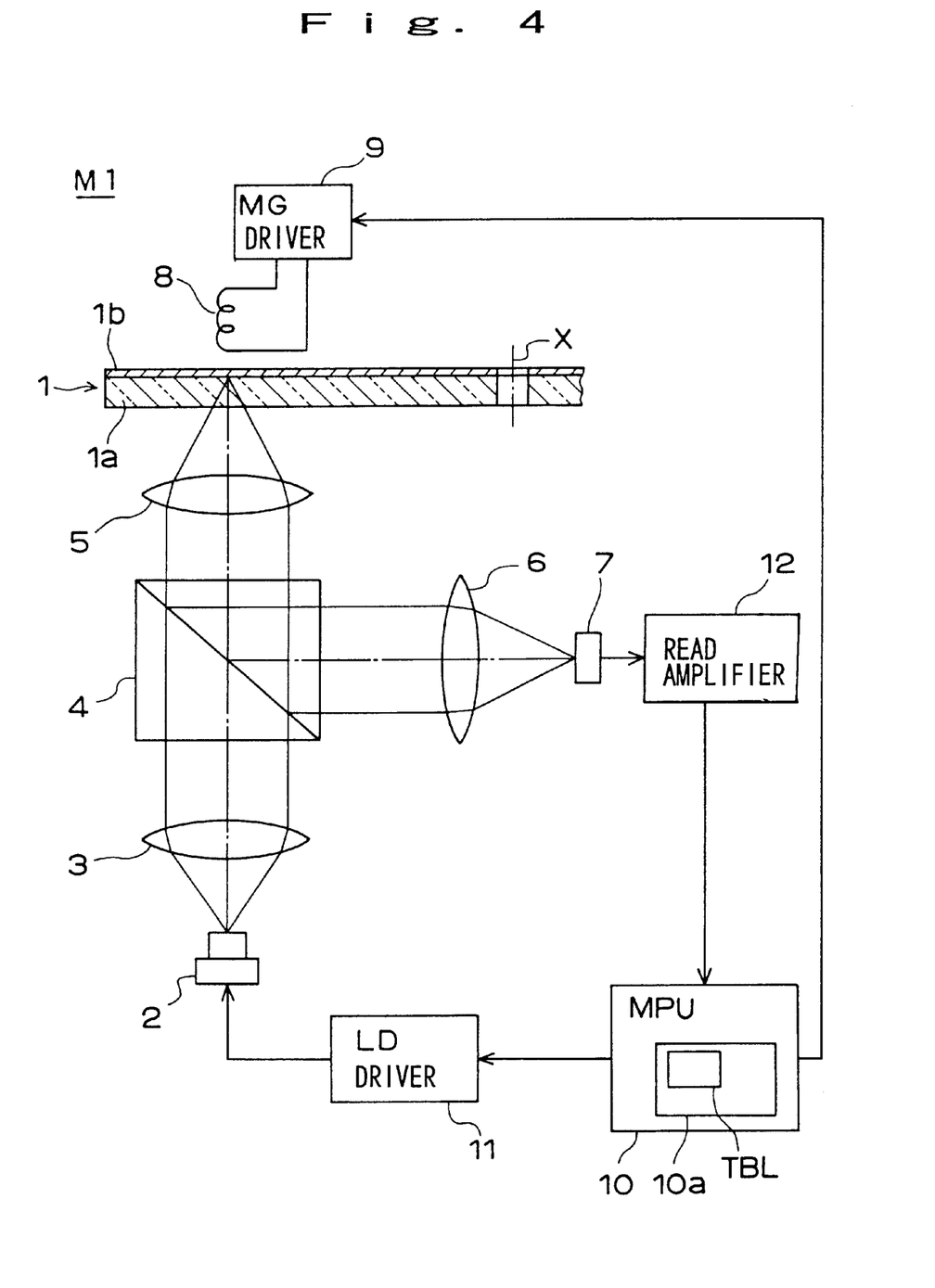
FIG. 4 is a block diagram schematically showing a structure of a magneto-optical disk drive to which the present invention is applied.

FIG. 4 shows a schematic structure of a magneto-optical disk drive to which the present invention is applied. The magneto-optical disk drive M1 includes a magneto-optical disk 1, a laser diode 2 as a light source, optical systems 3–6, a photo detector 7, a magnetic head 8, a magnetic head driver circuit 9, a microprocessor (MPU) 10, a laser diode driver circuit 11 and a read amplifier 12.

The magneto-optical disk 1 has a magnetic recording film 1b formed on a transparent substrate 1a. The magneto-optical disk 1 is driven to rotate around the center axis X by a rotation drive mechanism (not shown). A laser beam for recording information is irradiated to the magneto-optical disk 1 from the transparent substrate 1a side. The laser diode 2 emits the laser beam, which is collimated by a collimator lens 3 and passes a beam splitter 4. Then the laser beam is focused on the magnetic recording film 1b of the magneto-optical disk 1 by the object lens 5.

The laser diode 2, the collimator lens 3, the beam splitter 4 and the object lens 5 constitute a optical head portion along with a condenser lens 6 and a photo detector 7, which will be explained below. The optical head portion is driven to move in the radial direction of the magneto-optical disk 1 (left and right direction in FIG. 4) by a seek mechanism (not shown).

The portion of the magnetic recording film 1b that is irradiated with the laser beam is heated. When the temperature thereof becomes above the Curie point, the region is magnetized in the direction of the magnetic field applied externally. A magnetic head 8 is disposed at the magnetic recording film 1b side of the magnetic disk 1, and the magnetic recording film 1b is magnetized by the magnetic field generated by the magnetic head 8. The magnetizing direction, i.e., the direction of the magnetic field generated by the magnetic head 8 is controlled in accordance with the record information ("0" or "1"). Namely, the microprocessor (MPU) 10 controls the magnetic head 8 via the magnetic head driver circuit 9, so as to generate the magnetic field modulated with record information.

Furthermore, the microprocessor 10 controls the laser diode driver circuit 11, which controls the laser diode 2 with the driving pulse shown in FIG. 5 when writing information. In the present embodiment of the magnetic field modulation type, the irradiation of the laser beam is controlled by the pulsed light emission when writing information so that the shape of the edge portion of the record pit is sharpened. Thus, the read performance and the error rate are improved.

When reading the information recorded in the magneto-optical disk 1, the laser diode 2 emits the light continuously with a reading power that is weaker than the power for recording. The laser beam from the laser diode 2, in the same way as in recording, passes the collimator lens 3, the beam splitter 4 and the object lens 5. Then the laser beam is focused on the magnetic recording film 1b of the magneto-optical disk 1. The light reflected by the magnetic recording film 1b becomes an elliptically polarized light whose rotation angle depends on the magnetized direction of the magnetic recording film 1b. This reflected light passes the object lens 5, and the light path is changed by the beam splitter 4. The light is focused on the photo detector 7 by the condenser lens 6.

The photo detector 7 detects the data read signal and the address signal from the incident light. These signals are amplified and the waveforms thereof are shaped in the read amplifier 12. Then the signal is given to the microprocessor 10, which can recognize a position in the radial direction in the information recording area of the magneto-optical disk 1 on the basis of the detected address signal.

FIG. 3 shows the relationship among the peak power, the bottom power and the C/N ratio in accordance with a measured data, which is a basis of the present invention. FIG. 3 shows the C/N ratio as contour lines in the graph in which the vertical axis indicates the bottom power Pb (mW) and the horizontal axis indicates the peak power Pw (mW). The light emission duty is fixed to 33%.

The C/N ratio is the larger the better. In FIG. 3, the region where the C/N ratio is 48 (dB) is the optimum condition, for example. If the C/N ratio drops to 47 (dB) or 47.5 (dB), it is no longer the optimum condition. In FIG. 3, the line connecting center portions of the regions where the C/N ratio is 48 (dB) substantially satisfies the following equation.

$$Pb = -0.5Pw + C \text{ (}C \text{ is a constant)} \tag{1}$$

Namely, if the light emission duty is constant (33%), the optimum power, i.e., the peak power Pw and the bottom power Pb for the maximum C/N ratio is on the line defined by the equation (1). In other words, even if the peak power Pw is decreased, the C/N ratio can remain the same value by increasing the bottom power Pb.

Therefore, the average power Pave for recording expressed by the following equation is noted.

$$Pave = (D \times Pw + (100-D) \times Pb)/100 \tag{2}$$

Here, D is the light emission duty (%). If the disk recording medium is controlled to rotate in the constant peripheral speed in the entire recording area, the bottom power Pb is increased and the peak power Pw is decreased by recalculation, so that the recording average power Pave is not varied. The microprocessor 10 of the magneto-optical disk drive M1 shown in FIG. 4 performs the above-mentioned process in accordance with the flow chart shown in FIG. 1.

Figure 1:
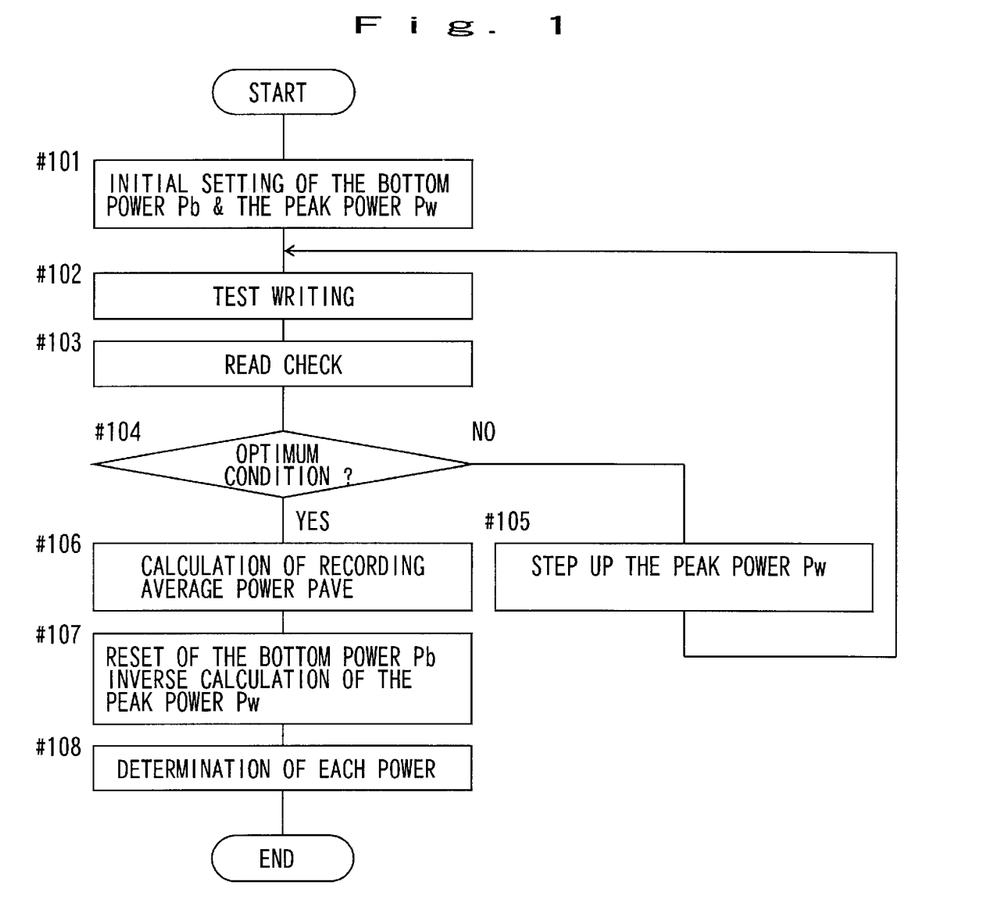
FIG. 1 is a flow chart showing a method for controlling a power of irradiating light to a recording medium according to an embodiment of the present invention.

FIG. 1 shows a process for determining the optimum bottom power Pb and the optimum peak power Pw when the light emission duty is fixed (e.g., to 30%). First, the bottom power Pb and the peak power Pw are set to initial values (Step #101). For example, the bottom power Pb is set to 0 mW, and the peak power Pw is set to 10 mW. Under this condition, the test writing is performed (Step #102), and the record state is checked by the read check (Step #103). It is judged if the laser power is the optimum power or not on the basis if the error rate of the read data satisfies an evaluation standard or not (Step #104). If the laser power is not the optimum power, the peak power Pw is increased by a step (Step #105), and the test writing is performed again (Step #102).

The step-up of the peak power Pw is performed by 1 mW, for example. Thus, the peak power Pw is increased step by step while the test writing and the read check are repeated until the error rate of the read data satisfies the evaluation standard. The peak power Pw when the error rate of the read data satisfies the evaluation standard is regarded as the optimum peak power.

Then, the fixed light emission duty D, the preset bottom power Pb and the optimum peak power Pw obtained by the test writing are substituted in the above equation (2), so that the recording average power Pave is calculated (Step #106). In the example explained above, if D=30%, Pb=0 mW, and the optimum peak power Pw obtained by the test writing equals 15 mW, the average power Pave is calculated to be 4.5 mW.

Then, the bottom power Pb is reset to a higher value (e.g., 2 mW) than the preset value (e.g., 0 mW), and the peak power Pw is calculated inversely from the equation (2). Namely, substituting the light emission duty D=30%, the bottom power Pb=2 mW and the recording average power Pave=4.5 mW in the equation (2), the peak power Pw is calculated to be 10.3 mW. Thus, the bottom power Pb of 2 mW and the peak power Pw of 10.3 mW are determined as the light emission power to be used for recording. By this recalculation, the peak power Pw is reduced from 15 mW to 10.3 mW, i.e., the peak power can be reduced to approximately two third.

Though the reset value of the bottom power is 2 mW in the above example, it is actually preferable to set the reset value of the bottom power substantially equal to the read power. If the reset value of the bottom power is too large, the edges of record pits may lose their shape and become not sharp. The read power is usually set to a value within a range that cannot affect information pits and that can derive sufficient reflected light. Therefore, if the reset value of the bottom power substantially equal to the read power, the above-mentioned problem does not occur.

Figure 2:
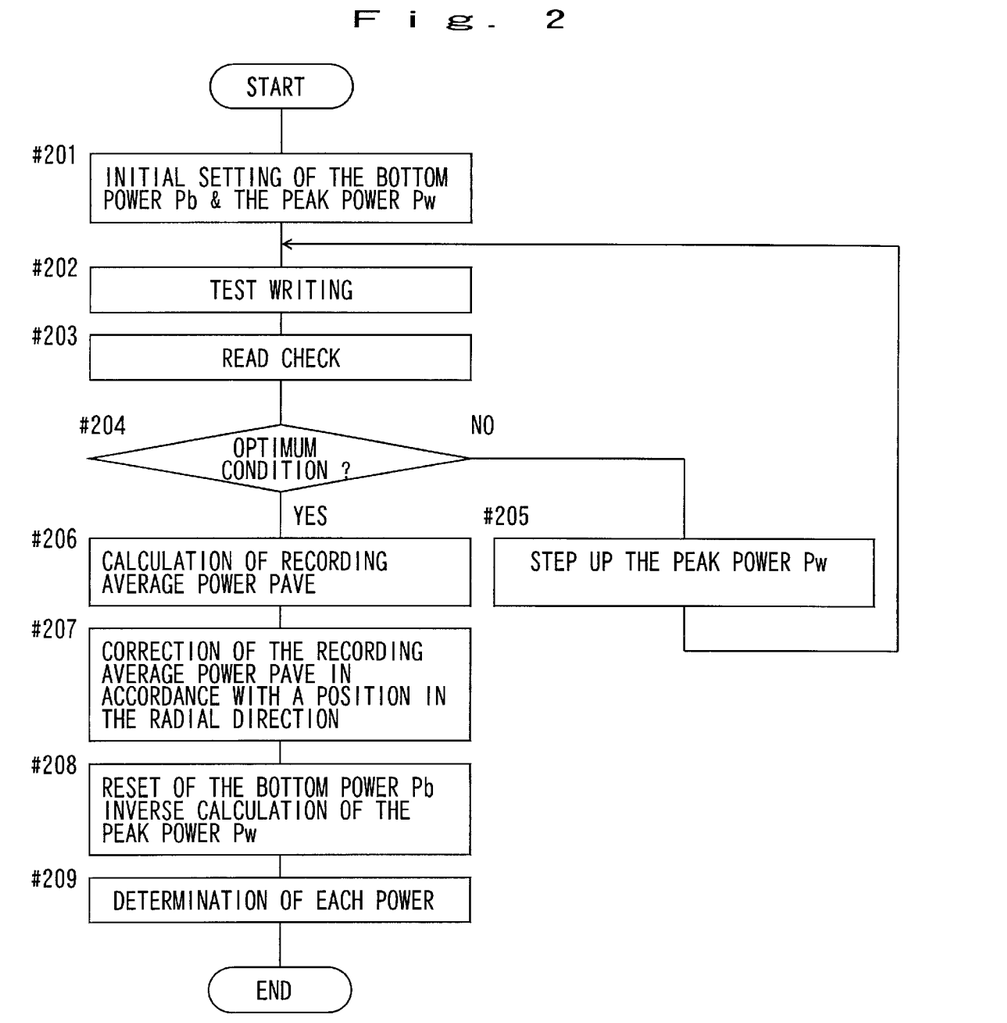
FIG. 2 is a flow chart showing a method for controlling a power of irradiating light to a recording medium according to another embodiment of the present invention.

FIG. 2 shows a flow chart of the process for determining the light emission power in accordance with another embodiment of the present invention. This embodiment is an example where the peripheral speed of the disk recording medium varies in accordance with a position in the radial direction of the disk. If the rotation speed is constant, for example, the closer to the periphery portion of the disk recording medium, the faster the peripheral speed is. Along with the increasing peripheral speed, the light emission power must be increased.

In FIG. 2, the explanation of the process from Step #201 through Step #206 is omitted because it is the same as the process from Step #101 through Step #106 in FIG. 1. In this embodiment, the recording average power Pave obtained by the calculation of Step #206 is corrected in accordance with a position in the radial direction in the recording area of the disk (Step #207), and the peak power is calculated inversely using the corrected recording average power Pave' (Step #208). Specifically, the recording average power Pave is multiplied by a predetermined coefficient K so as to obtain the corrected recording average power Pave' that is equal to K×Pave. The recording area of the disk recording medium is divided into plural zones in the radial direction (for example, a zone has a width of 1–1.5 mm in the radial direction). Then, unique value of the coefficient is assigned to each of the zones. In the above-mentioned example, the closer to the periphery of the disk recording medium, the larger the coefficient K that is assigned to the zone is, since larger light emission power is required.

The relationship between each zone and the coefficient K is memorized as a look-up table TBL in memory 10a of the microprocessor 10 as shown in FIG. 4. The less number of the zones, the smaller the size of the table to be memorized becomes, while the rougher the correction precision of the light emission power becomes. The position in the radial direction in the recording area can be recognized by the microprocessor 10 from the address signal out of the read signal that is sent to the microprocessor 10 from the photo detector 7 via the read amplifier 12, as explained above.

Furthermore, the test writing in the present embodiment is preferably performed in a recording area located at the inner portion where the peripheral speed is the slowest. If the peripheral speed is slow, the irradiation power can be small, so that the insufficient peak power after the test writing can be avoided and the optimum power can be determined securely.

Though the above-explained embodiment is an example in which the present invention is applied to the magneto-optical disk drive that is a magnetic modulation type, the present invention can be applied to the other type that is the light modulation type magneto-optical disk drive, or can be applied to an optical disk drive that is a phase-change type.

As explained above, the present invention provides a method and a device for reducing the peak power by the recalculation in accordance with the recording average power. Thus, the device can use the power of the irradiated light more efficiently under the limitation of the maximum output of the light source and the maximum efficiency of condensing light in the optical system, so as to support the high speed data transmission. In addition, the optimum peak power can be determined by the minimal number of test writing.

If the peripheral speed of the disk recording medium varies in accordance with a position in the radial direction, the recording area of the disk recording medium is divided into plural zones, each of which is given a unique coefficient for correction. Thus, by performing recalculation using the coefficient, the peak power can be obtained easily.

What is claimed is:

1. A method for controlling power of pulsed light emitted by a light source, condensed by a object lens and irradiated to a recording medium for recording information in the recording medium, the method comprising the steps of:

performing test writing with the pulsed light having a fixed bottom power and variable peak power;

calculating an optimum average power in accordance with the bottom power and the peak power of the optimum condition obtained by the test writing step; and recalculating the peak power and the bottom power in accordance with the optimum average power so that the peak power is decreased and the bottom power is increased.

2. The method according to claim 1, wherein the recalculating step is performed so that a recording average power is substantially equal to the optimum average power.

3. The method according to claim 1, wherein the recording medium is a disk recording medium whose peripheral speed on recording varies in accordance with a position in the radial direction, and the recalculating step is performed so that a recording average power is substantially equal to a value obtained by multiplying the optimum average power with a coefficient determined in accordance with the position in the radial direction.

4. The method according to claim 3, wherein the test writing step is performed at the position in the radial direction where the peripheral speed is the slowest.

5. The method according to claim 3, wherein the recording area of the disk recording medium is divided into plural zones in the radial direction, and a unique value of the coefficient is assigned to each of the zones.

6. The method according to claim 1, wherein the test writing step includes setting the fixed bottom power smaller than read power, and the recalculating step is performed so that the bottom power is increased to the value substantially equal to the read power.

7. A device for controlling power of pulsed light emitted by a light source, condensed by a object lens and irradiated to a recording medium for recording information in the recording medium, the device comprising:

a means for test writing with the pulsed light having a fixed bottom power and variable peak power;

a means for calculating an optimum average power in accordance with the bottom power and the peak power of the optimum condition obtained by the test writing means; and a means for recalculating the peak power and the bottom power in accordance with the optimum average power so that the peak power is decreased and the bottom power is increased.

8. The device according to claim 7, wherein the recalculating means recalculates the peak power and the bottom power so that a recording average power is substantially equal to the optimum average power.

9. The device according to claim 7, wherein the recording medium is a disk recording medium whose peripheral speed on recording varies in accordance with a position in the radial direction, and the recalculating means recalculates the peak power and the bottom power so that a recording average power is substantially equal to a value obtained by multiplying the optimum average power with a coefficient determined in accordance with the position in the radial direction.

10. The device according to claim 7, wherein the test writing means performs the test writing at the position in the radial direction where the peripheral speed is the slowest.

11. The device according to claim 10, wherein the recording area of the disk recording medium is divided into plural zones in the radial direction, and a unique value of the coefficient is assigned to each of the zones.

12. The device according to claim 7, wherein the test writing means sets the fixed bottom power smaller than read power, and the recalculating means recalculates the peak power and the bottom power so that the bottom power is increased to the value substantially equal to the read power.

13. A device for recording information comprising:

a recording medium;

a light source for emitting pulsed light;

an optical system for condensing the light from the light source to irradiate the recording medium and for condensing light reflected by the recording medium;

a photo detector for receiving the condensed light so as to generate a read signal; and a controller for controlling a drive circuit of the light source in accordance with an output signal of the photo detector, the controller including means for test writing with the pulsed light having a fixed bottom power and variable peak power, a means for calculating an optimum average power in accordance with the bottom power and the peak power of the optimum condition obtained by the test writing means, and a means for recalculating the peak power and the bottom power in accordance with the optimum average power so that the peak power is decreased and the bottom power is increased.

* * * * *